(12) United States Patent
Yamanouchi et al.

(10) Patent No.: US 7,567,753 B2
(45) Date of Patent: Jul. 28, 2009

(54) VIDEO CAMERA AND IMAGE EXTRACTING APPARATUS UTILIZED FOR SAME

(75) Inventors: Akiko Yamanouchi, Hyogo (JP); Akira Toba, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 503 days.

(21) Appl. No.: 11/369,178

(22) Filed: Mar. 6, 2006

(65) Prior Publication Data

US 2006/0216010 A1    Sep. 28, 2006

(30) Foreign Application Priority Data

Mar. 10, 2005  (JP) ............................ 2005-066472
Feb. 22, 2006  (JP) ............................ 2006-044696

(51) Int. Cl.
*G03B 17/00*  (2006.01)

(52) U.S. Cl. .................................. 396/55; 348/208.12

(58) Field of Classification Search ......... 359/676–693, 359/290–295, 298, 223, 846–849, 872–881; 348/208.7, 208.12, 240.12, 345, 347, 357, 348/362, 363, 240.2, 208.5, 207.2, E5.024, 348/E5.025, E5.026, E5.031, E5.032, E5.046, 348/E5.047, E5.066; 396/55, 60, 111, 72–89, 396/257

See application file for complete search history.

(56) References Cited

U.S. PATENT DOCUMENTS

| 5,099,323 | A | * | 3/1992 | Morimura et al. | ...... | 348/207.99 |
| 5,909,242 | A | * | 6/1999 | Kobayashi et al. | ....... | 348/208.3 |
| 6,573,930 | B2 | * | 6/2003 | Kyuma et al. | ............ | 348/208.5 |

FOREIGN PATENT DOCUMENTS

JP    11-183951    7/1999

* cited by examiner

*Primary Examiner*—Reena Aurora
(74) *Attorney, Agent, or Firm*—Gerald T. Bodner (57) ABSTRACT

A video camera includes an LCD monitor. On the LCD monitor, an object scene image belonging to a camera-shake correction area out of the object scene image captured by an imaging surface is displayed. A CPU determines whether or not a movement of the object scene image captured by the imaging surface satisfies a pan/tilt condition or a camera-shake condition referring to a threshold value. The threshold value is set to a large numerical value as a zoom magnification is high. A camera-shake condition determining process is started in place of a pan/tilt condition determining process when the pan/tilt condition is satisfied. Also, the pan/tilt condition determining process is started in place of the camera-shake condition determining process when the camera-shake condition is satisfied. In addition, the camera-shake correction area is moved in such a direction as to cancel the movement of the object scene image captured by the imaging surface when the pan/tilt condition is not satisfied.

15 Claims, 6 Drawing Sheets

VIDEO CAMERA AND IMAGE EXTRACTING APPARATUS UTILIZED FOR SAME

CROSS REFERENCE OF RELATED APPLICATION

The disclosure of Japanese Patent Application No. 2006-44696 is incorporated herein by reference.

BACKGROUND OF THE INVENTION

1. Field of the Invention

The present invention relates to an image extracting apparatus and a video camera. More specifically, the present invention relates to an image extracting apparatus which extracts a partial object scene image belonging to a specific area out of an object scene image captured by an imaging surface.

2. Description of the Prior Art

An example of such a kind of conventional apparatus is disclosed in a Patent Document 1 (Japanese Patent Laying-open No. 11-183951). The prior art is for restricting a camera-shake correction performance in panning/tilting in order to prevent an erroneous camera-shake correction operation in response to the panning/tilting. It should be noted that the longer a focal length of an imaging optical system is (the higher the zoom magnification is), the more the degree of limitation of the camera-shake correction performance is. However, a variation of the object scene image due to a camera shake is increased as the zoom magnification is higher. Whereas, in the prior art, as the zoom magnification is higher, the camera-shake correction performance is substantially limited, and therefore, it is impossible to properly prevent a camera shake in photographing under a high magnification.

SUMMARY OF THE INVENTION

Therefore, it is a primary object of the present invention to provide a novel image extracting apparatus.

Another object of the present invention is to provide an image extracting apparatus capable of executing a good camera shake correction under a high zoom magnification.

The other object of the present invention is to provide a video camera capable of executing a good camera shake correction under a high zoom magnification.

An image extracting apparatus (10) according to one form of the present invention extracts a partial object scene image belonging to a specific area out of an object scene image captured by an imaging surface (14f), and comprises a first determining means (S9, S11) for determining whether or not a movement of the object scene image captured by the imaging surface satisfies a pan/tilt condition, a second determining means (S21) for determining whether or not the movement of the object scene image captured by the imaging surface satisfies a camera-shake condition referring to a threshold value, a first activating means (S13) for activating the second determining means in place of the first determining means when a determination result of the first determining means is affirmative, a second activating means (S23) for activating the first determining means in place of the second determining means when a determination result of the second determining means is affirmative, a setting means (S19) for setting a large numerical value to the threshold value as a zoom magnification is high, and a moving means (S15) for moving the specific area within the imaging surface in such a direction as to cancel the movement of the object scene image captured by the imaging surface when the determination result of the first determining means is negative.

The extracted partial object scene image is an object scene image belonging to a specific area out of the object scene image captured by the imaging surface. The first determining means determines whether or not a movement of the object scene image captured by the imaging surface satisfies a pan/tilt condition, and the second determining means determines whether or not the movement of the object scene image captured by the imaging surface satisfies a camera-shake condition referring to a threshold value. The threshold value is set to a large numerical value by a setting means as the zoom magnification is high.

A first activating means activates the second determining means in place of the first determining means when a determination result of the first determining means is affirmative. A second activating means activates the first determining means in place of the second determining means when a determination result of the second determining means is affirmative. A moving means moves the specific area within the imaging surface in such a direction as to cancel the movement of the object scene image captured by the imaging surface when the determination result of the first determining means is negative.

Even if a camera shake amount of an operator is uniform, the movement amount of the object scene captured by the imaging surface is increased as the zoom magnification is high. Here, if the threshold value is fixed, as the zoom magnification becomes high, the determination result of the second determining means is difficult to make affirmative, and a camera-shake correction operation is difficult to execute by the moving means. In the invention, as the zoom magnification becomes high, the threshold value is increased, and therefore, the determination result of the second determining means becomes affirmative more easily than in the fixed threshold value. Consequently, even under a high zoom magnification, it is possible to realize a good camera-shake correction operation.

In accordance with another form of the present invention, the setting means of the image extracting apparatus sets the threshold value such that a maximum moving amount of the imaging surface in which an affirmative determination result is obtained with respect to the second determining means is coincident among different zoom magnifications. Thus, it becomes possible to stabilize a camera-shake correction operation.

The image extracting apparatus of the present invention may further include a display means (32) for displaying a partial object scene image extracted from the specific area.

The image extracting apparatus of the present invention may further include a detecting means (22) for periodically detecting the movement of the object scene image captured by the imaging surface, wherein the pan/tilt condition is a logical OR between a first condition that a movement direction is continuously coincident N times (N is two or more integer), and a second condition that a cumulative value of a movement amount in the same direction exceeds a reference value relating to an angle of view.

A video camera constructed in accordance with the present invention has an image extracting apparatus formed in accordance with the present invention and described previously.

An area control program according to one form of the present invention is executed by a processor (24) of an image extracting apparatus (10) which extracts a partial object scene image belonging to a specific area out of an object scene image captured by an imaging surface (14f), and includes a first determining step (S9, S11) for determining whether or not a movement of the object scene image captured by the imaging surface satisfies a pan/tilt condition, a second determining step (S21) for determining whether or not the movement of the object scene image captured by the imaging surface satisfies a camera-shake condition referring to a threshold value, a setting step (S19) for setting a large numerical value to the threshold value as a zoom magnification is high, a first activating step (S13) for activating the second determining step in place of the first determining step when a determination result of the first determining step is affirmative, a second activating step (S23) for activating the first determining step in place of the second determining step when a determination result of the second determining step is affirmative, and a moving step (S15) for moving the specific area within the imaging surface in such a direction as to cancel the movement of the object scene image captured by the imaging surface when the determination result of the first determining step is negative.

Similarly to the image extracting apparatus of the present invention, it is possible to realize a good camera-shake correction operation with the area control program of the present invention described previously.

In accordance with another form of the present invention, the setting step of the area control program sets the threshold value such that a maximum moving amount of the imaging surface in which an affirmative determination result is obtained with respect to the second determining means is coincident among different zoom magnifications.

An area control program according to another form of the present invention is an area control method of an image extracting apparatus (10) which extracts a partial object scene image belonging to a specific area out of an object scene image captured by an imaging surface (14f), and includes a first determining step (S9, S11) for determining whether or not the movement of the object scene image captured by the imaging surface satisfies a pan/tilt condition, a second determining step (S21) for determining whether or not the movement of the object scene image captured by the imaging surface satisfies camera-shake condition referring to a threshold value, a setting step (S19) for setting a large numerical value to the threshold value as a zoom magnification is high, a first activating step (S13) for activating the second determining step in place of the first determining step when a determination result of the first determining step is affirmative, a second activating step (S23) for activating the first determining step in place of the second determining step when a determination result of the second determining step is affirmative, and a moving step (S15) for moving the specific area within the imaging surface in such a direction as to cancel the movement of the object scene image captured by the imaging surface when the determination result of the first determining step is negative.

Similarly to the image extracting apparatus of the present invention, it is possible to realize a good camera-shake correction operation with the area control method of the present invention described previously.

A video camera (10) formed in accordance with the present invention comprises an imaging means (14) for capturing an object scene image through a lens (46), a first determining means (S9, S11) for determining whether or not a movement of a camera housing (56) satisfies a pan/tilt condition, a second determining means (S21) for determining whether or not a movement of the camera housing satisfies a camera-shake condition referring to a threshold value, a first activating means (S13) for activating the second determining means in place of the first determining means when a determination result of the first determining means is affirmative, a second activating means (S23) for activating the first determining means in place of the second determining means when a determination result of the second determining means is affirmative, a setting means (S19) for setting a large numerical value to the threshold value as a zoom magnification is high, and a changing means (S35) for changing a positional relationship between the lens and the imaging means in such a direction as to cancel the movement of the object scene image captured by the imaging means when a determination result of the first determining means is negative.

The object scene image through the lens is captured by an imaging means. A first determining means determines whether or not the movement of a camera housing satisfies a pan/tilt condition, and a second determining means determines whether or not the movement of the camera housing satisfies the camera-shake condition referring to a threshold value. The threshold value is set such that it indicates a large numerical value by a setting means.

A first activating means activates the second determining means in place of the first determining means when a determination result of the first determining means is affirmative. A second activating means activates the first determining means in place of the second determining means when a determination result of the second determining means is affirmative. A changing means changes a positional relationship between the lens and the imaging means in such a direction as to cancel the movement of the object scene image captured by the imaging means when a determination result of the first determining means is negative.

Even if a camera shake amount by an operator is uniform, the movement amount of the object scene captured by the imaging surface is increased as the zoom magnification is high. Here, if the threshold value is fixed, as the zoom magnification becomes high, the determination result of the second determining means is difficult to make affirmative, and further, a camera-shake correction operation is difficult to execute by the moving means. In the invention, as the zoom magnification becomes high, the threshold value is increased, and therefore, the determination result of the second determining means becomes affirmative more easily than in the fixed threshold value. Consequently, even under a high zoom magnification, it is possible to realize a good camera-shake correction operation.

In accordance with another form of the present invention, the setting means of the video camera sets the threshold value such that a maximum moving amount of the camera housing in which an affirmative determination result is obtained with respect to the second determining means is coincident among different zoom magnifications. Thus, it becomes possible to stabilize a camera-shake correction operation.

The video camera of the present invention may further include a display means (32) for displaying a partial object scene image captured by the imaging surface.

The video camera of the present invention may further include a detecting means (S31, S33) for periodically detecting a movement of the object scene image captured by the imaging surface, wherein the pan/tilt condition is a logical OR between a first condition that a movement direction is continuously coincident N times (N is two or more integer), and a second condition that a cumulative value of a movement amount in the same direction exceeds a reference value relating to an angle of view.

An imaging control program according to one form of the present invention is executed by a processor (24) of a video camera (10) having an imaging means (14) for capturing an object scene image through a lens (46), and comprises a first determining step (S9, S11) for determining whether or not a movement of a camera housing (56) satisfies a pan/tilt condition, a second determining step (S21) for determining whether or not the movement of the camera housing satisfies a camera-shake condition referring to a threshold value, a first activating step (S13) for activating the second determining step in place of the first determining step when a determination result of the first determining step is affirmative, a second activating step (S23) for activating the first determining step in place of the second determining step when a determination result of the second determining step is affirmative, a setting step (S19) for setting a large numerical value to the threshold value as a zoom magnification is high, and a changing step (S35) for changing a positional relationship between the lens and the imaging means in such a direction as to cancel the movement of the object scene image captured by the imaging means when a determination result of the first determining step is negative.

Similarly to the video camera of the present invention, it is possible to realize a good camera-shake correction operation with the imaging control program of the present invention described previously.

An imaging control program according to an invention of claim 14 is dependent on claim 13, and the setting step sets the threshold value such that a maximum moving amount of the camera housing in which an affirmative determination result is obtained with respect to the second determining step is coincident among different zoom magnifications.

In yet another form of the present invention, an imaging control method of a video camera (10), having an imaging means (14) for capturing an object scene image through a lens (46), comprises a first determining step (S9, S11) for determining whether or not a movement of a camera housing (56) satisfies a pan/tilt condition, a second determining step (S21) for determining whether or not the movement of the camera housing satisfies a camera-shake condition referring to a threshold value, a first activating step (S13) for activating the second determining step in place of the first determining step when a determination result of the first determining step is affirmative, a second activating step (S23) for activating the first determining step in place of the second determining step when a determination result of the second determining step is affirmative, a setting step (S19) for setting a large numerical value to the threshold value as a zoom magnification is high, and a changing step (S35) for changing a positional relationship between the lens and the imaging means in such a direction as to cancel the movement of the object scene image captured by the imaging means when the determination result of the first determining step is negative.

Similarly to the video camera of the present invention, it is possible to realize a good camera-shake correction operation with the imaging control method of the present invention described previously.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 (A) is a timing chart showing one example of changes of a camera operation;

FIG. 4 (B) is a timing chart showing one example of changes of determination conditions;

FIG. 4 (C) is a timing chart showing one example of changes of a state of a flag;

DETAILED DESCRIPTION OF THE PREFERRED EMBODIMENTS

Figure 1:
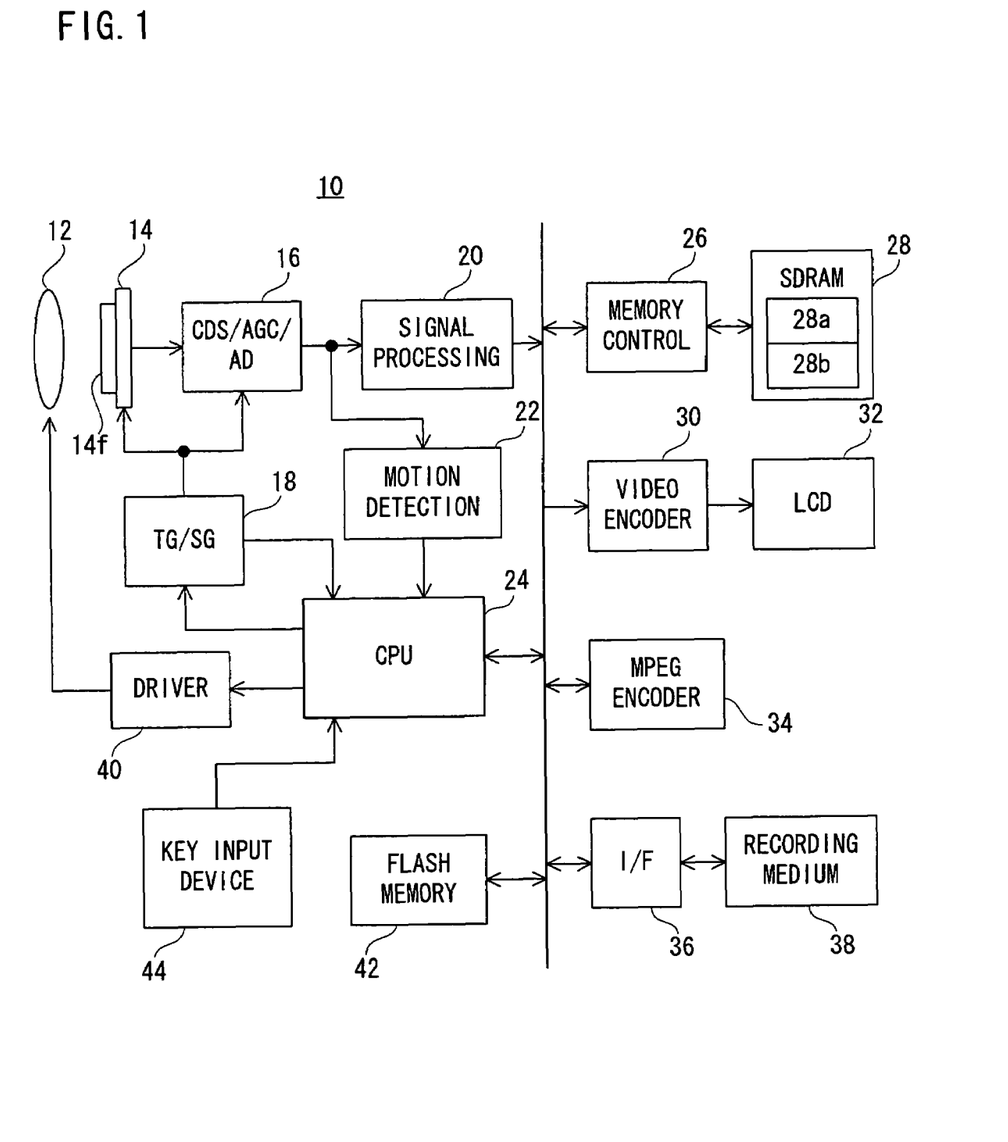
FIG. 1 is a block diagram showing a configuration of one embodiment of the present invention.

Referring to FIG. 1, a digital video camera 10 of this embodiment includes a zoom lens 12. An optical image of an object scene is irradiated onto an imaging surface 14$f$ of an image sensor 14 through the zoom lens 12, and is subjected to a photoelectronic conversion. Thus, electric charges representing an object scene image, that is, raw image signals are generated.

When a power source is turned on, a CPU 24 instructs a TG/SG 18 to repeatedly perform an exposure and a charge reading. The TG/SG 18 applies a plurality of timing signals to the image sensor 14 to execute an exposure of the imaging surface 14$f$ of the image sensor 14 and a reading of the electric charge thus obtained. The raw image signal generated by the imaging surface 14$f$ is read in the order according to raster scanning in response to a vertical synchronization signal Vsync output per 1/30 seconds.

The raw image signal output from the image sensor 14 is subjected to a series of processes such as a correlative double sampling, an automatic gain adjustment, and A/D conversion by a CDS/AGC/AD circuit 16. A signal processing circuit 20 performs processes such as a white balance adjustment, color separation, YUV conversion, etc. on the raw image data output from the CDS/AGC/AD circuit 16 to write image data in a YUV format to a display image area 28$a$ of an SDRAM 28 through a memory control circuit 26.

Figure 2:
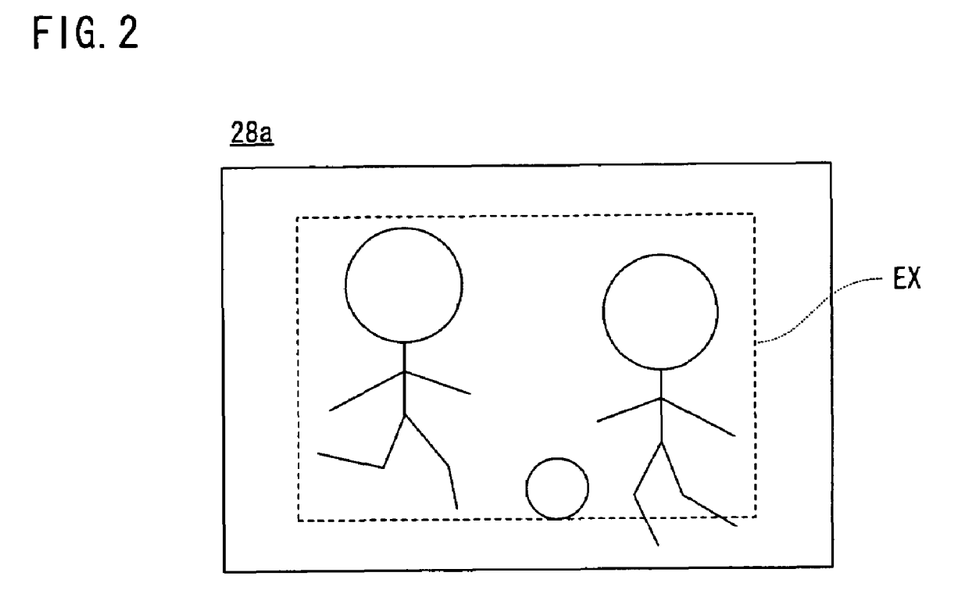
FIG. 2 is an illustrative view showing a part of an operation of FIG. 1 embodiment.
Figure 3:
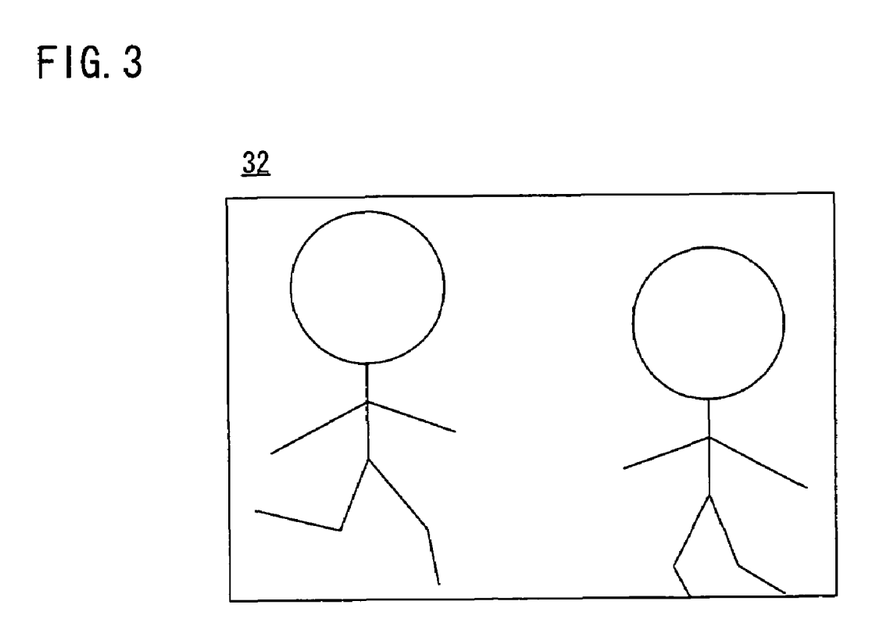
FIG. 3 is an illustrative view showing one example of an object scene image to be displayed on an LCD monitor.

Referring to FIG. 2, a camera-shake correction area EX is assigned to the display image area 28$a$. A video encoder 30 reads partial image data stored in the camera-shake correction area EX through the memory control circuit 26 per 1/30 seconds to convert the read partial image data into a composite video signal. Thus, when the image data shown in FIG. 2 is stored in the display image area 28$a$, a through-image shown in FIG. 3 is displayed on an LCD monitor 32.

When a zoom operation is performed with a key input device 44, the CPU 24 instructs a driver 40 to move the zoom lens 12. The zoom lens 12 is moved to an optical axis direction by the driver 40 to thereby vary a zoom magnification of the through-image displayed on the LCD 32. The zoom magnification becomes high as the zoom lens 12 is moved from a wide-side to a tele-side.

A motion detection circuit 22 fetches raw image data to be utilized for a motion detection process out of the raw image data output from the CDS/AGC/AD circuit 16 per 1/30 seconds, and detects a motion vector representing changes of the object scene due to a camera shake or a pan/tilt operation on the basis of the fetched raw image data. The detected motion vector is applied to the CPU 24.

Figure 4:
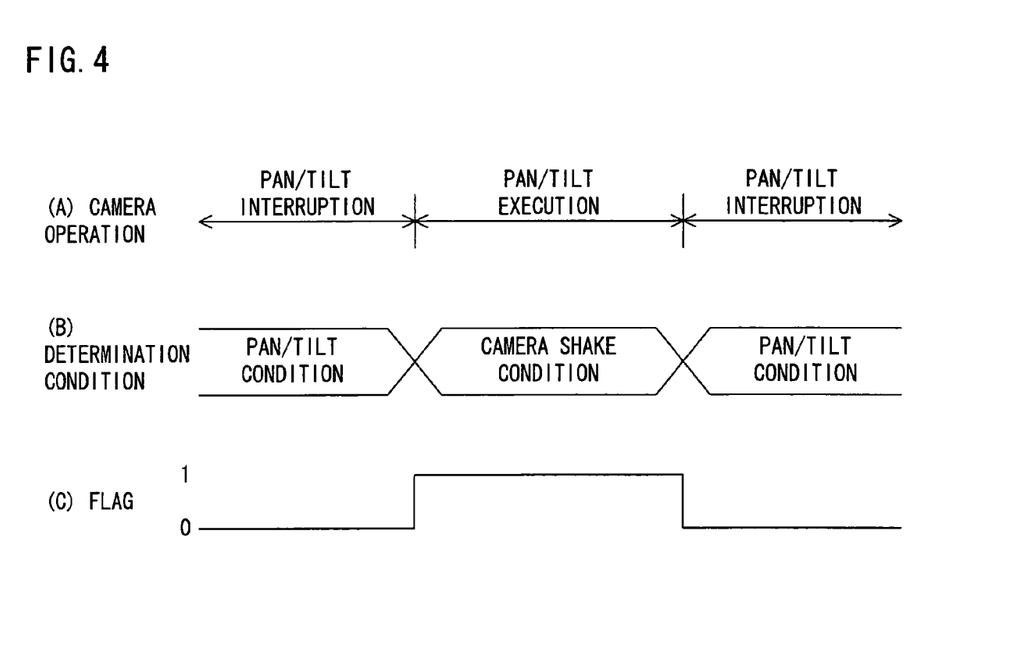

Referring to FIG. 4 (A) and FIG. 4 (B), the CPU 24 determines a pan/tilt condition when the operator stops performing a pan/tilt operation, and determines a camera shake condition when the operator executes a pan/tilt operation. The pan/tilt condition is satisfied when the direction of the motion vector is coincident during successive 15 frames, or when the cumulative value of the motion vector in the same direction is above 5% of the angle of view. The camera shake condition is satisfied when a motion vector quantity detected at the latest frame is below a threshold value TH.

If the pan/tilt condition is not satisfied, the CPU 24 considers that the pan/tilt operation is still being interrupted to execute a camera shake correction process. The camera-shake correction area EX shown in FIG. 2 is moved in such a direction as to cancel the motion vector through execution of the camera shake correction process. It should be noted that the movement amount is 0.9 times larger than the vector quantity.

When the pan/tilt condition is satisfied, the CPU 24 considers that the pan/tilt operation is started to interrupt the camera shake correction process, and determines the camera shake condition in place of the pan/tilt condition.

If the camera shake condition is not satisfied, the CPU 24 considers that the pan/tilt operation is still being executed to continue to interrupt the camera shake correction process. When the camera shake condition is satisfied, the CPU 24 considers that the pan/tilt operation is interrupted to determine the pan/tilt condition in place of the camera shake condition, and restarts the camera shake correction process.

Figure 5:
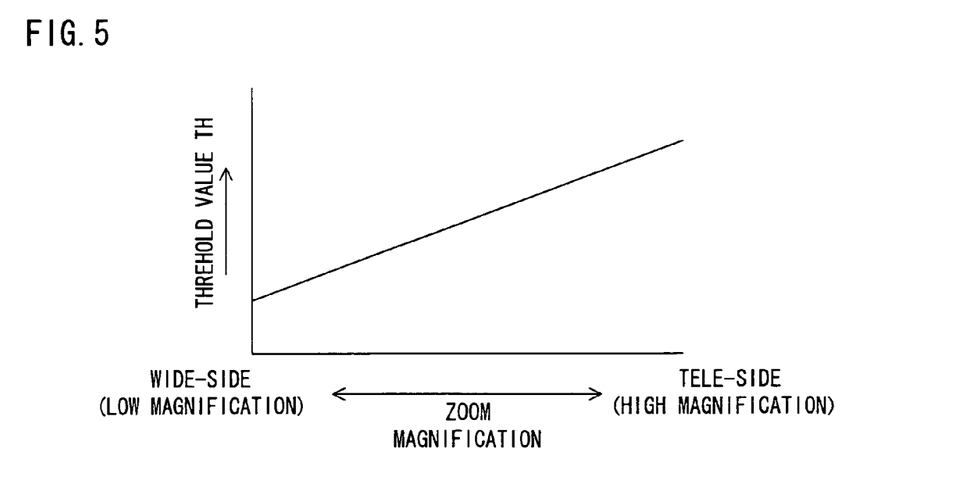
FIG. 5 is a graph showing one example of a relationship between a zoom magnification and a threshold value.

The threshold value TH to be noted when the camera shake condition is determined is set to a numerical value corresponding to the current zoom magnification. That is, the graph data having a characteristic shown in FIG. 5 is stored in a flash memory 42, and the CPU 24 sets a numerical value corresponding to the current zoom magnification to the threshold value TH with reference to the graph data. According to FIG. 5, the threshold value TH becomes large as the zoom magnification becomes high. More specifically, the threshold value TH is set such that a maximum value of a camera shake amount satisfying the camera shake condition is coincident between the different zoom magnifications.

In a case that a camera shake amount by an operator is uniform, the motion vector quantity detected by the motion detection circuit 22 is increased as the zoom magnification is high. Here, if the threshold value TH is fixed, as the zoom magnification becomes high, a camera-shake condition is difficult to satisfy. In this embodiment, as the threshold value TH has the characteristic shown in FIG. 5, the camera shake condition is satisfied more easily than in the fixed threshold value TH being fixed. Consequently, even under a high zoom magnification, it is possible to realize a good camera-shake correction operation.

When a recording start operation is performed by the key input device 44, the CPU 24 starts an MPEG encoder 34. The MPEG encoder 34 reads the partial image data from the camera-shake correction area EX of the SDRAM 28 through the memory control circuit 26, compresses the read partial image data in an MPEG 4 format, and writes the compressed image data, that is, the MPEG data to an MPEG area 28b of the SDRAM 28 through the memory control circuit 26.

The CPU 24 reads the MPEG data from the MPEG area 28b through the memory control circuit 26 every time that the data amount accumulated in the MPEG area 28b reaches a threshold value. The read MPEG data is recorded onto a recording medium 38 through an I/F 36. When a recording end operation is performed by the key input device 44, the CPU 24 stops the MPEG encoder 34, and completes the access to the SDRAM 28 after completion of recording the MPEG data remaining in the MPEG area 28b.

Figure 6:
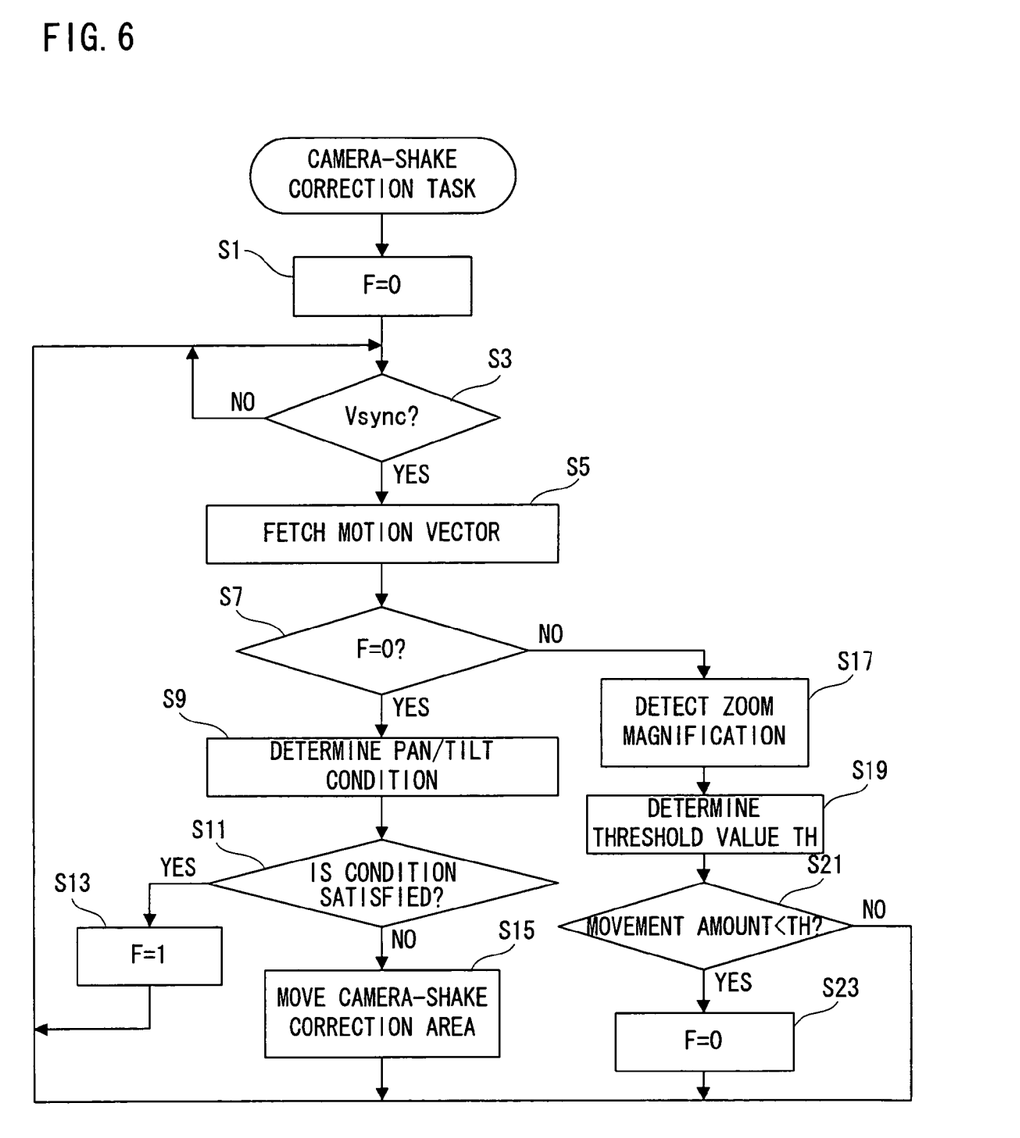
FIG. 6 is a flowchart showing a part of an operation of a CPU applied to FIG. 1 embodiment.

The CPU 24 executes in parallel a plurality of tasks including the camera-shake correction task shown in FIG. 6. It should be noted that a control program corresponding to these tasks is stored in the flash memory 42.

First, in a step S1, a flag F is set to "0". The flag F is a flag for determining which is determined, the pan/tilt condition and the camera shake condition. As understood from FIG. 4 (B) and FIG. 4 (C), "0" corresponds to the pan/tilt condition, and "1" corresponds to the camera shake condition. By the process in the step S1, determination of the pan/tilt condition is instructed.

When a vertical synchronization signal Vsync is generated, the process proceeds from a step S3 to a step S5 to fetch the motion vector of the current frame from the motion detection circuit 22. In a step S7, it is determined whether or not the flag F is "0", and if "YES" is determined, a pan/tilt condition determining process is executed in a step S9.

If the aforementioned pan/tilt condition is satisfied, "YES" is determined in a step S11, and "1" is set to the flag F in a step S13. On the contrary thereto, if the pan/tilt condition is not satisfied, the process proceeds from the step S11 to a step S15 to move the camera-shake correction area EX so as to cancel the motion vector. After completion of the step S13 or S15, the process returns to the step S3.

If "NO" in the step S7, a magnification of the zoom lens 12 is detected in a step S17. In a step S19, with reference to the graph data having the characteristic shown in FIG. 5, the numerical value corresponding to the current zoom magnification is determined as the threshold value TH. In a step S21, it is determined whether or not the motion vector quantity is below the determined threshold value TH, that is, it is determined whether or not the camera shake condition is satisfied. If the camera shake condition is not satisfied, the process directly returns to the step S3, and if the camera shake condition is satisfied, "0" is set to the flag F in a step S23, and then, the process returns to the step S3.

As understood from the above-description, the extracted partial object scene image is an object scene image belonging to the camera-shake correction area EX out of the object scene image captured by the imaging surface 14f. The CPU 24 determines whether or not the cause of the movement of the object scene image captured by the imaging surface 14f is pan and/or tilt of the imaging surface 14f, that is, whether or not the pan/tilt condition is satisfied (S9). The CPU 24 also determines whether or not the movement amount of the object scene image captured by the imaging surface 14f is below the threshold value TH, that is, whether or not the camera shake condition is satisfied (S21). Here, the threshold value TH is set to indicate a large numerical value as the zoom magnification becomes high (S19).

The camera-shake condition determining process is started in place of the pan/tilt condition determining process when the pan/tilt condition is satisfied (S13). Also, the pan/tilt condition determining process is started in place of the camera-shake condition determining process when the camera shake condition is satisfied (S23). In addition, the camera-shake correction area EX is moved in such a direction as to cancel the movement of the object scene image captured by the imaging surface 14f when the pan/tilt condition is not satisfied (S15).

Even if a camera shake amount by an operator is uniform, the movement amount of the object scene captured by the imaging surface 14f is increased as the zoom magnification is high. Here, if the threshold value is fixed, as the zoom magnification becomes high, the camera shake condition is difficult to satisfy, and furthermore, a camera-shake correction operation is difficult to execute. In this embodiment, as the zoom magnification becomes high, the threshold value TH is increased, and therefore, the camera shake condition is satisfied more easily than in the threshold value TH being fixed. Consequently, even under a high zoom magnification, it is possible to realize a good camera-shake correction operation.

Figure 7:
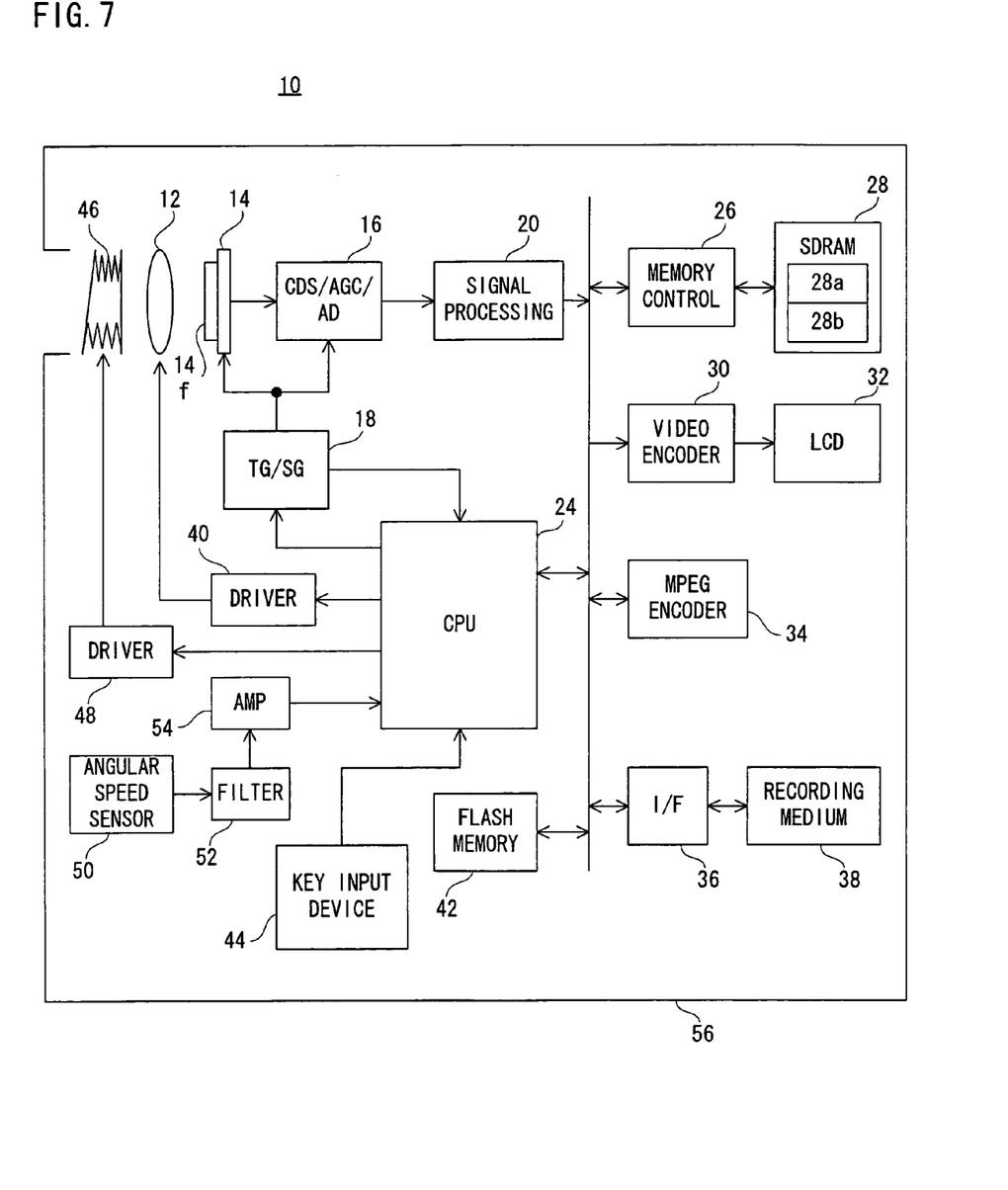
FIG. 7 is a block diagram showing a configuration of another embodiment of the present invention.

With referring to FIG. 7, a video camera 10 according to another embodiment is the same as the FIG. 1 embodiment except that the motion detection circuit 22 is removed, and a camera-shake correction lens 46, a driver 48, an angular speed sensor 50, a filter 52, and an amplifier 54 are added. Accordingly, a description on a configuration and an operation similarly to FIG. 1 embodiment will be omitted as little as possible.

An optical image of the object scene is irradiated onto the imaging surface 14f of the image sensor 14 via the camera-shake correction lens 46 and the zoom lens 12. The image data in a YUV format representing the object scene image captured by the imaging surface 14f is stored in the display image area 28a of the SDRAM 28.

When a through-image is displayed, the video encoder 30 reads the entire image data stored in the display image area 28a through the memory control circuit 26, and converts the read entire image data into a composite video signal.

When a recording start operation is performed, the MPEG encoder 34 reads the entire image data stored in the display image area 28a through the memory control circuit 26, and compresses the read entire image data.

The angular speed sensor 50 is fixed to a camera housing 56 and detects a shake of the camera housing 56. The detection result is applied to the CPU 24 via the filter 52 and the amplifier 54.

Figure 8:
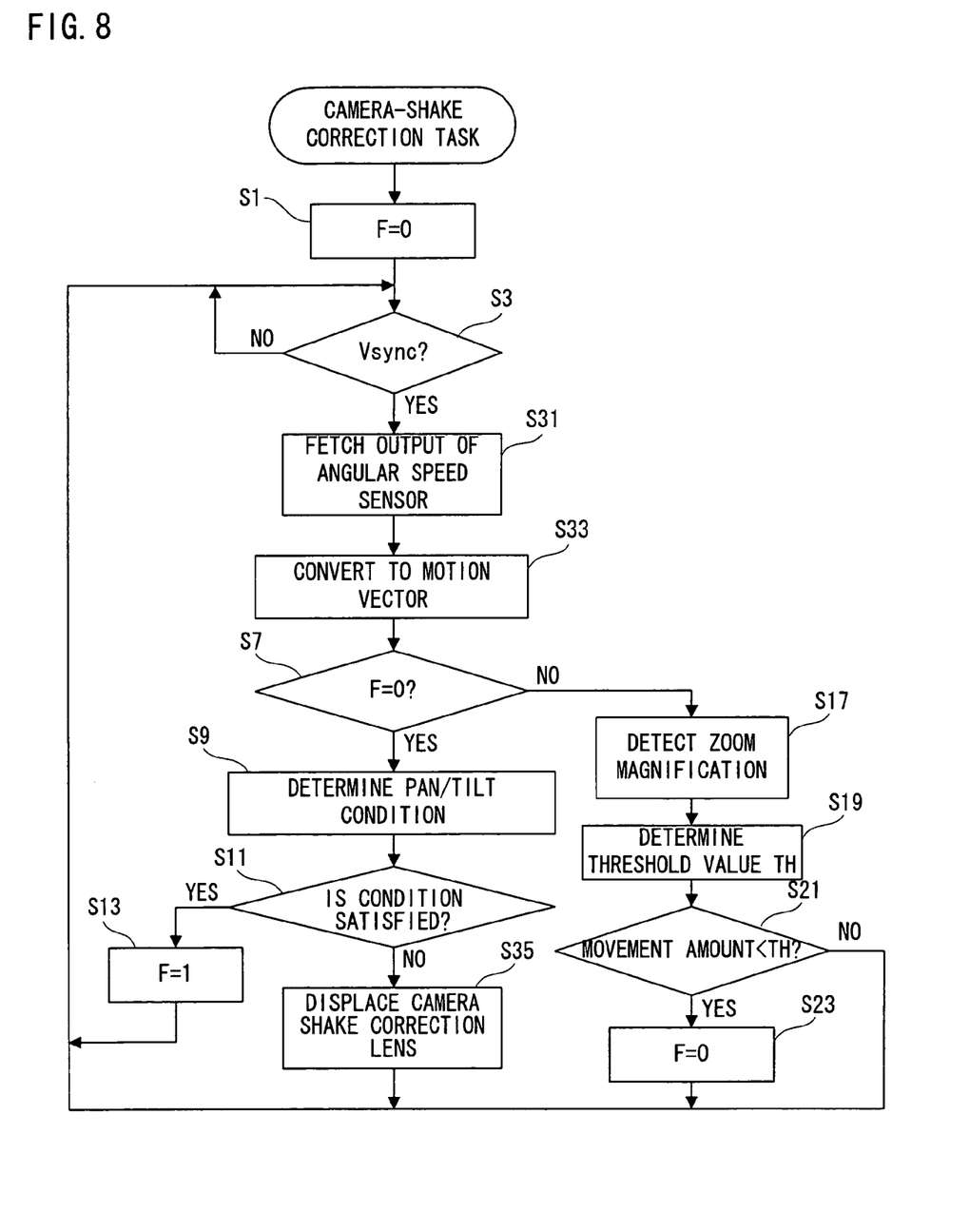
FIG. 8 is a flowchart showing a part of an operation of the CPU applied to FIG. 7 embodiment.

The CPU 24 executes a camera-shake correction task shown in FIG. 8 in place of the camera-shake correction task shown in FIG. 6. It should be noted that the camera-shake correction task shown in FIG. 8 is the same as the camera-shake correction task shown in FIG. 6 except that processes in steps S31 and S33 are executed in place of the process in the step S5, and a process in a step S35 is executed in place of the step S15.

In the step S31, the detection result of the angular speed sensor 50 is fetched through the filter 52 and the amplifier 54. In the step S33, the fetched detection result is converted into the motion vector. The converted motion vector defines a movement direction and a movement amount of the camera housing 56. In the step S35, in order to cancel the movement of the object scene due to the camera shake, a posture of the camera-shake correction lens 46 is changed. The posture of the camera-shake correction lens 46 is shifted by the driver 48.

Under such a camera-shake correction task, the CPU 24 operates as follows: the CPU 24 determines the pan/tilt condition similarly to FIG. 1 embodiment when the operator interrupts the pan/tilt operation, and determines the camera shake condition similarly to FIG. 1 embodiment when the operator executes the pan/tilt operation.

If the pan/tilt condition is not satisfied, the CPU 24 considers that the pan/tilt operation is still being interrupted to execute a camera shake correction process by utilizing the driver 48 and the camera-shake correction lens 46. The camera-shake correction lens 46 is displaced so as to cancel the movement of the object scene due to the camera shake.

When the pan/tilt condition is satisfied, the CPU 24 considers that the pan/tilt operation is started to thereby interrupt the camera shake correction process and determine the camera shake condition in place of the pan/tilt condition. If the camera shake condition is not satisfied, the CPU 24 considers that the pan/tilt operation is still being executed, to thereby continue to interrupt the camera shake correction process. When the camera shake condition is satisfied, the CPU 24 considers that the pan/tilt operation is interrupted to determine the pan/tilt condition in place of the camera shake condition and restart the camera shake correction process.

Thus, the object scene image through the camera-shake correction lens 46 is captured by the image sensor 14. The CPU 24 determines whether or not the movement of the camera housing 56 satisfies the pan/tilt condition (S9, S11), and determines whether or not the movement of the camera housing 56 satisfies the camera-shake condition (S21). The threshold value TH is set by the CPU 24 (S19) so as to denote a large numerical value as the zoom magnification is high.

The camera-shake condition determining process is started in place of the pan/tilt condition determining process when the pan/tilt condition is satisfied (S13). Also, the pan/tilt condition determining process is started in place of the camera-shake condition determining process when the camera shake condition is satisfied (S23). In addition, the positional relationship between the camera-shake correction lens 46 and the image sensor 14 is changed so as to cancel the movement of the object scene image captured by the image sensor 14 when the pan/tilt condition is not satisfied (S35). In this embodiment also, it is possible to realize a good camera-shake correction operation irrespective of the zoom magnification.

It should be noted that in these embodiments, although an optical zoom utilizing the zoom lens 12 is executed, if motion detection is executed after an electronic zooming process, it is possible to apply the present invention to a video camera adopting an electronic zoom system.

In addition, in FIG. 1 embodiment, although the shake of the imaging surface 14f is detected on the basis of the raw image data of the object scene, the shake of the imaging surface 14f may be detected by utilizing the angular speed sensor like FIG. 7 embodiment.

In addition, in FIG. 7 embodiment, although the camera-shake correction lens 46 is shifted, the image sensor 14 may be shifted in place of the camera-shake correction lens 46 or together with the camera-shake correction lens 46.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image extracting apparatus which extracts a partial object scene image belonging to a specific area out of an object scene image captured by an imaging surface, comprising:

a first determiner for determining whether or not a movement of the object scene image captured by said imaging surface satisfies a pan/tilt condition;

a second determiner for determining whether or not the movement of the object scene image captured by said imaging surface satisfies a camera-shake condition referring to a threshold value;

a first activator for activating said second determiner in place of said first determiner when a determination result of said first determiner is affirmative;

a second activator for activating said first determiner in place of said second determiner when a determination result of said second determiner is affirmative;

a setter for setting a large numerical value to said threshold value as a zoom magnification is high; and a mover for moving said specific area within said imaging surface in such a direction as to cancel the movement of said object scene image captured by said imaging surface when the determination result of said first determiner is negative.

2. An image extracting apparatus according to claim 1, wherein said setter sets said threshold value such that a maximum moving amount of said imaging surface in which an affirmative determination result is obtained with respect to said second determiner is coincident among different zoom magnifications.

3. An image extracting apparatus according to claim 1, further comprising a displayer for displaying the partial object scene image extracted from said specific area.

4. An image extracting apparatus according to claim 1, further comprising a detector for periodically detecting the movement of said object scene image captured by said imaging surface, wherein said pan/tilt condition is a logical OR between a first condition that a movement direction is continuously coincident N times (N is two or more integers), and a second condition that a cumulative value of a movement amount in the movement direction exceeds a reference value relating to an angle of view.

5. A video camera having an image extracting apparatus according to claim 1.

6. An area control program executed by a processor of an image extracting apparatus which extracts a partial object scene image belonging to a specific area out of an object scene image captured by an imaging surface, including:
   a first determining step for determining whether or not a movement of the object scene image captured by said imaging surface satisfies a pan/tilt condition;
   a second determining step for determining whether or not the movement of the object scene image captured by said imaging surface satisfies a camera-shake condition referring to a threshold value;
   a setting step for setting a large numerical value to said threshold value as a zoom magnification is high;
   a first activating step for activating said second determining step in place of said first determining step when a determination result of said first determining step is affirmative;
   a second activating step for activating said first determining step in place of said second determining step when a determination result of said second determining step is affirmative; and
   a moving step for moving said specific area within said imaging surface in such a direction as to cancel the movement of said object scene image captured by said imaging surface when the determination result of said first determining step is negative.

7. An area control program according to claim 6, wherein said setting step sets said threshold value such that a maximum moving amount of said imaging surface in which an affirmative determination result is obtained with respect to said second determining step is coincident among different zoom magnifications.

8. An area controlling method of an image extracting apparatus which extracts a partial object scene image belonging to a specific area out of an object scene image captured by an imaging surface, including:
   a first determining step for determining whether or not the movement of the object scene image captured by said imaging surface satisfies a pan/tilt condition;
   a second determining step for determining whether or not the movement of the object scene image captured by said imaging surface satisfies a camera-shake condition referring to a threshold value;
   a setting step for setting a large numerical value to said threshold value as a zoom magnification is high;
   a first activating step for activating said second determining step in place of said first determining step when a determination result of said first determining step is affirmative;
   a second activating step for activating said first determining step in place of said second determining step when a determination result of said second determining step is affirmative; and
   a moving step for moving said specific area within said imaging surface in such a direction as to cancel the movement of said object scene image captured by said imaging surface when the determination result of said first determining step is negative.

9. A video camera, comprising:
   an imager for capturing an object scene image through a lens;
   a first determiner for determining whether or not a movement of a camera housing satisfies a pan/tilt condition;
   a second determiner for determining whether or not a movement of said camera housing satisfies a camera-shake condition referring to a threshold value;
   a first activator for activating said second determiner in place of said first determiner when a determination result of said first determiner is affirmative;
   a second activator for activating said first determiner in place of said second determiner when a determination result of said second determiner is affirmative;
   a setter for setting a large numerical value to said threshold value as a zoom magnification is high; and
   a changer for changing a positional relationship between said lens and said imager in such a direction as to cancel the movement of said object scene image captured by said imager when a determination result of said first determiner is negative.

10. A video camera according to claim 9, wherein said setter sets said threshold value such that a maximum moving amount of said camera housing in which an affirmative determination result is obtained with respect to said second determiner is coincident between different zoom magnifications.

11. A video camera according to claim 9, further comprising a displayer for displaying the object scene image captured by said imaging surface.

12. A video camera according to claim 9, further comprising a detector for periodically detecting a movement of said object scene image captured by said imaging surface, wherein said pan/tilt condition is a logical OR between a first condition that a movement direction is continuously coincident N times (N is two or more integers), and a second condition that a cumulative value of a movement amount in the movement direction exceeds a reference value relating to an angle of view.

13. An imaging control program executed by a processor of a video camera having an imager for capturing an object scene image through a lens, comprising:
   a first determining step for determining whether or not a movement of a camera housing satisfies a pan/tilt condition;
   a second determining step for determining whether or not the movement of said camera housing satisfies a camera-shake condition referring to a threshold value;
   a first activating step for activating said second determining step in place of said first determining step when a determination result of said first determining step is affirmative;

a second activating step for activating said first determining step in place of said second determining step when a determination result of said second determining step is affirmative;

a setting step for setting a large numerical value to said threshold value as a zoom magnification is high; and a changing step for changing a positional relationship between said lens and said imager in such a direction as to cancel the movement of said object scene image captured by said imager when a determination result of said first determining step is negative.

14. An imaging control program according to claim 13, wherein said setting step sets said threshold value such that a maximum moving amount of said camera housing in which an affirmative determination result is obtained with respect to said second determining step is coincident among different zoom magnifications.

15. An imaging control method of a video camera having an imager for fetching an object scene image through a lens, comprising:

a first determining step for determining whether or not a movement of a camera housing satisfies a pan/tilt condition;

a second determining step for determining whether or not the movement of said camera housing satisfies a camera-shake condition referring to a threshold value;

a first activating step for activating said second determining step in place of said first determining step when a determination result of said first determining step is affirmative;

a second activating step for activating said first determining step in place of said second determining step when a determination result of said second determining step is affirmative;

a setting step for setting a large numerical value to said threshold value as a zoom magnification is high; and a changing step for changing a positional relationship between said lens and said imager in such a direction as to cancel the movement of said object scene image captured by said imager when the determination result of said first determining step is negative.

* * * * *